(12) United States Patent
Subramaniam et al.

(10) Patent No.: US 11,200,545 B2
(45) Date of Patent: Dec. 14, 2021

(54) MEDIATOR WEBSITE FOR AUTHENTICATING PAYMENT ENTITIES AND SUPPORTING DYNAMIC INTERFACE OBJECTS FOR PAYMENTS

(71) Applicant: MASTERCARD INTERNATIONAL INCORPORATED, Purchase, NY (US)

(72) Inventors: Shanthan Subramaniam, Baldwin Place, NY (US); Sandeep Malhotra, Greenwich, CT (US); Marek Kurylko, Bloomfield, NJ (US)

(73) Assignee: Mastercard International Incorporated, Purchase, NY (US)

( * ) Notice: Subject to any disclaimer, the term of this patent is extended or adjusted under 35 U.S.C. 154(b) by 129 days.

(21) Appl. No.: 16/409,237

(22) Filed: May 10, 2019

(65) Prior Publication Data
US 2020/0356962 A1    Nov. 12, 2020

(51) Int. Cl.
*G06Q 20/02* (2012.01)
*G06Q 20/36* (2012.01)
*G06Q 20/40* (2012.01)

(52) U.S. Cl.
CPC ........... *G06Q 20/02* (2013.01); *G06Q 20/363* (2013.01); *G06Q 20/3674* (2013.01); *G06Q 20/4014* (2013.01)

(58) Field of Classification Search
CPC .. G06Q 20/02; G06Q 20/363; G06Q 20/3674; G06Q 20/4014
USPC ........................................................ 705/78
See application file for complete search history.

(56) References Cited

U.S. PATENT DOCUMENTS

| | | | |
|---|---|---|---|
| 7,137,006 B1* | 11/2006 | Grandcolas | G06F 21/41 713/180 |
| 2012/0191719 A1* | 7/2012 | Musgrove | G06Q 30/0605 707/740 |
| 2013/0138570 A1 | 5/2013 | Ross | |

(Continued)

FOREIGN PATENT DOCUMENTS

| | | |
|---|---|---|
| WO | 2011100529 A1 | 8/2011 |
| WO | 2013101297 A1 | 7/2013 |
| WO | 2016036418 A1 | 3/2016 |

OTHER PUBLICATIONS

International Search Report and Written Opinion for corresponding application PCT/US2020/028750, 6 pages, dated Jul. 9, 2020.

*Primary Examiner* — James D Nigh
(74) *Attorney, Agent, or Firm* — Ohlandt, Greeley, Ruggiero & Perle, LLP

(57) ABSTRACT

A system and method for secure and intuitive payment transactions at an ecommerce merchant website with a client device. The system has a trusted platform that hosts a Mediator site and Manifest database that includes a plurality of Manifest files. Each Manifest file includes a unique identifier and mapped payor information for a payment entity. The platform uses the Manifest to validate trusted payment entities and provide the Mediator site. The Mediator site generates cookies with payor information from the Manifest files, which are transmitted stored on user devices. These cookies are employed to facilitate trusted and intuitive transactions at merchant websites using dynamic interface objects presented on the user's client device interface.

16 Claims, 13 Drawing Sheets

(56) References Cited

U.S. PATENT DOCUMENTS

| | | | |
|---|---|---|---|
| 2016/0034891 A1* | 2/2016 | Carpenter | G06Q 20/40 |
| | | | 705/44 |
| 2016/0217463 A1* | 7/2016 | de Gouvea | G06Q 20/108 |
| 2017/0178110 A1* | 6/2017 | Swanson | G06Q 20/227 |
| 2018/0315309 A1* | 11/2018 | Becker | H04L 9/0643 |
| 2019/0147515 A1* | 5/2019 | Hurley | G06Q 30/0613 |
| | | | 705/44 |
| 2020/0118068 A1* | 4/2020 | Turetsky | G06Q 20/06 |

* cited by examiner

Cookie Structure

FIG. 9A

|  | Unknown 901 | 1) First Use Installed App but before checkout 902 | 2) Second Use 903 | 3) Third Use 904 | 4) Delete Bank 2 App 905 |
|---|---|---|---|---|---|
| User Journey 900a | User goes to merchant with dynamic checkout button but no partner Issuer apps installed 901a | Payment made using Bank 1 (Bank 2 not installed) 902a | Payment made using Bank 2 (recently installed but not yet used for checkout) 903a | Payment made using Bank 2 issuer app 904a | User deletes Bank 2 app, payments default to using Bank 1 Issuer app 905a |
| Bank 1 (only Installed) 900b | Pay with Bank Account (Generic) logo displayed 901b | PBA + Bank 1 displayed on Button 902b | PBA + Bank 1 displayed on Button 903b | Not Displayed on Dynamic Button 904b | PBA + Bank 1 displayed on Button 905b |
| Bank 2 (second Installed) 900c | Pay with Bank Account (Generic) logo displayed 901c | N/A 902c | Not Displayed on Dynamic Button 903c | PBA + Bank 2 displayed on Button 904c | N/A 905c |
| Payment sheet 900d | 901d No supported Partner Issuer apps reflected | Default is Bank 1 902d | Default is Bank 1 903d | Default changes to Bank 2 904d | Default is Bank 1 905d |

MEDIATOR WEBSITE FOR AUTHENTICATING PAYMENT ENTITIES AND SUPPORTING DYNAMIC INTERFACE OBJECTS FOR PAYMENTS

BACKGROUND OF THE DISCLOSURE

1. Field of the Disclosure

The present disclosure relates to methods and systems for electronic transactions on websites.

2. Description of the Related Art

In the field of electronic transaction systems, there exists a need to provide enhanced security and ease for transactions by users on merchant websites.

Electronic payment systems fall into a variety of categories, for example, an exchange model (e.g., cash-like, check-like or hybrid) or a central authority contact (e.g., online). For example, based on an exchange model, E-payment systems can be divided into cash-like systems, such as electronic cash (e.g., notes, e-cash, cryptocurrency), check-like systems such as credit or debit card systems, or hybrid systems such as stored-value card based systems. Each of these systems have different technological challenges that impede trusted electronic transaction with payors. For example, the usage of digital cash enables full anonymity, but also means a payor cannot be identified or trusted. Payment card systems provide enhanced security for information transfer as well as authentication of transaction participant identities by registration and certification, but may not provide any transactional trust for entities that are not transacting to the payment card system. Further, electronic transactions to merchant sites provide a danger to client users in the form of malicious technology, such as phishing sites, which entice people to transact on fake websites made to look like real merchants. Finally, a vast amount of electronic commerce occurs over both web browsers and dedicated applications via evolving Application Programming Interfaces (APIs) on mobile devices, for example, banking applications.

SUMMARY OF THE DISCLOSURE

What is needed is a system architecture that enables transactions by trusted payors on websites on both full web browsers and payment entity applications on client devices. Also, a user interface (UI) presented to a user client computer during a transaction implementation can depend on a browser vendor for a merchant server computer, which means that the experience might differ from one browser to another. Accordingly what is also needed is technology for coordinating web browser and dedicated payment application user interfaces to enable consistent, non-confusing transactions due to, inter alia, conflicting payment applications and browser interface objects.

In an embodiment, described is a system, method, and computer program for a platform comprising a Mediator site and a Manifest database. The Manifest database comprises Manifest files for each of plurality of payment entities. For each Manifest file, the payment entity is mapped to a unique identifier for the payment entity.

The system also includes a client device application for communicating with one of the payment entities. When a user engages in a checkout at a merchant website, the application is configured to open an interface to an enrollment page to enroll one of the plurality of payment entities mapped to the unique identifier. When the user enrolls with application, the client device opens a web browser interface to the Mediator site and sends the unique identifier for the payment entity to the Mediator site. The Mediator site then validates the unique identifier as on the Manifest and generates a cookie including the unique identifier mapped to payment entity from the mediator site and sends it to the client device. The cookie is also configured to include payment entity information and tracking fields for a plurality of payment entities validated to the client device. The cookie is configured to allow a payment application and merchant websites to present a dynamic interface object on the client user's graphic user interface when the client user engages in a transaction on a merchant website. In an embodiment, the platform obtains payor information about the payment entity, and generates the Manifest file including the payor information about payment entity.

In an embodiment, the disclosure provides a dynamic interface object for an application or web browser comprising code for displaying payor information about a payment entity from a cookie placed in a user device by a mediator website. The dynamic interface object is configured to display the payor information for one of a plurality of payment entities on a client user device's graphic user interface. The dynamic interface object is configured to default to display the payor entity information that was last used for a transaction operation, navigate a client device to a payment entity website, and provide payment data for transacting with a merchant site.

The dynamic interface object is configured to access the cookie data including a unique identifier identifying the payment entity. The unique identifier is generated by a platform for the Mediator site and mapped to the payment entity. The mapped data is stored on a Manifest file hosted at the platform. The cookie data includes a tracking field configured to identify the sequence of the payment entity, and a Last Updated tracking field configured to update the time the payment entity was used for a transaction operation. The tracking field data is used to determine select, from the plurality of payment entities, which payment entity payor information to display on the user's client device.

These and other systems, methods, objects, features, and advantages of the present disclosure will be apparent to those skilled in the art from the following detailed description of the embodiments and the drawings.

BRIEF DESCRIPTION OF THE DRAWINGS

FIG. 9A shows a matrix of outcomes for a merchant website and a client user employing a dynamic interface object.

DESCRIPTION OF THE EMBODIMENTS

Various embodiments now will be described more fully hereinafter with reference to the accompanying drawings, which form a part hereof, and which show, by way of illustration, specific embodiments by which the disclosure may be practiced. The embodiments can, however, be embodied in many different forms and should not be construed as limited to the embodiments set forth herein. Rather, these embodiments are provided so that this disclosure will be thorough and complete, and will fully convey the scope of the embodiments to those skilled in the art. The following detailed description is, therefore, not to be taken in a limiting sense. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

Figure 1:
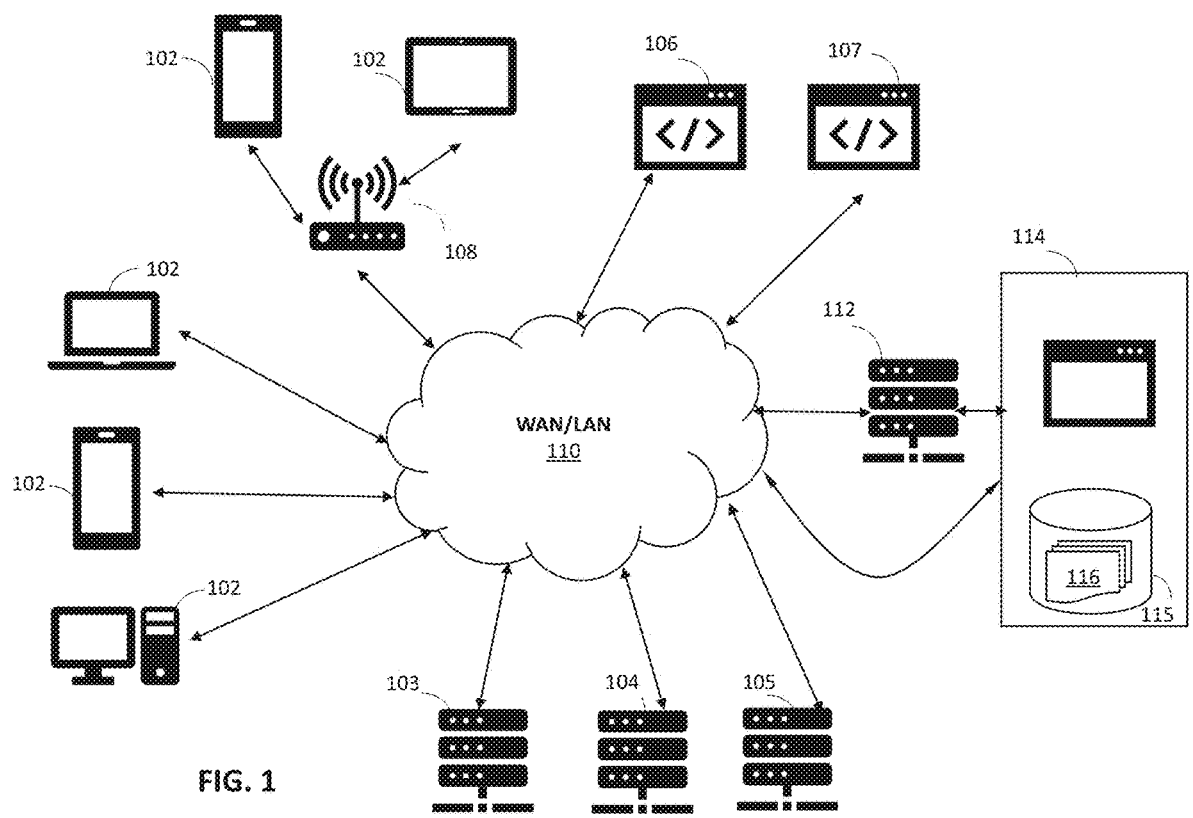
FIG. 1 is a diagram of system for implementing an exemplary embodiment of the present disclosure.
Figure 2:
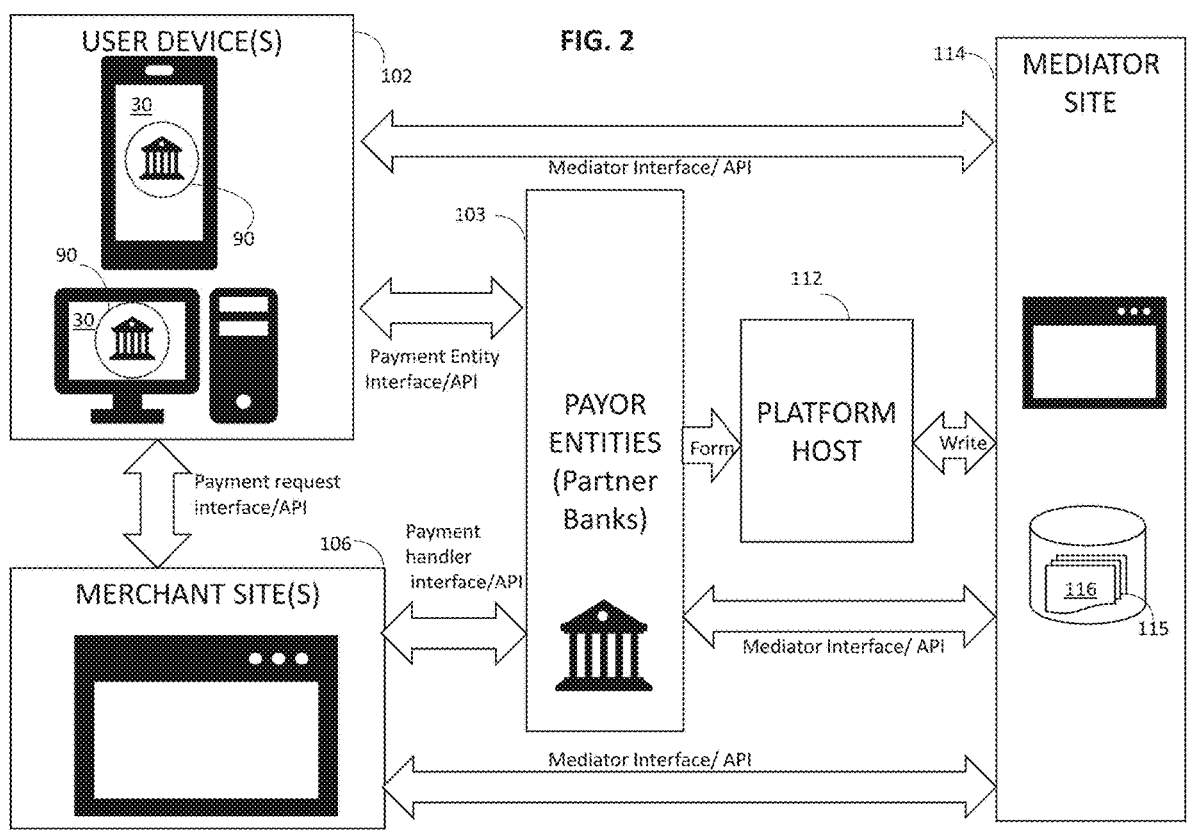
FIG. 2 is a diagram of a system architecture for implementing the exemplary embodiment of the present disclosure.

FIGS. 1-2 show components of one embodiment of an environment in which embodiments of the innovations described herein can be practiced. Not all of the components may be required to practice the innovations, and variations in the arrangement and type of the components can be made without departing from the spirit or scope of the innovations. As shown, system 100 of FIG. 1 includes local area networks (LANs)/wide area networks (WANs)—(network) 110, wireless network 108, client computers 102, Payment Entity Servers 103, 104, 105, Merchant Site Servers 106, 107, Platform Host Server Computer 112, and Manifest Site Server Computer 114.

At least one embodiment of client computers 102-105 is described in more detail below in conjunction with FIG. 11. In one embodiment, at least some of client computers 102 can operate over a wired and/or wireless network, such as networks 110 and/or 108. Generally, client computers 102 can include virtually any computer capable of communicating over a network to send and receive information, perform various online activities, offline actions, or the like. In one embodiment, one or more of client computers 102 can be configured to operate within a business or other entity to perform a variety of services for the business or other entity. However, client computers 102 are not constrained to these services and can also be employed, for example, as an end-user computing node, in other embodiments. It should be recognized that more or less client computers can be included within a system such as described herein, and embodiments are therefore not constrained by the number or type of client computers employed.

Computers that can operate as client computer 102 can include computers that typically connect using a wired or wireless communications medium such as personal computers, multiprocessor systems, microprocessor-based or programmable electronic devices, network PCs, or the like. In some embodiments, client computers 102 can include virtually any portable personal computer capable of connecting to another computing device and receiving information such as, laptop computer, smart mobile telephone, and tablet computers, and the like. However, portable computers are not so limited and can also include other portable devices such as cellular telephones, radio frequency (RF) devices, Personal Digital Assistants (PDAs), handheld computers, wearable computers, integrated devices combining one or more of the preceding devices, and the like. As such, client computers 102 typically range widely in terms of capabilities and features. Moreover, client computers 102 can access various computing applications, including a browser, and other web-based applications, including a payor entity application as described herein.

A web-enabled client computer can include a browser application that is configured to receive and to send web pages, web-based messages, and the like. The browser application can be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message. In one embodiment, a user of the client computer can employ the browser application to perform various activities over a network (online). However, another application can also be used to perform various online activities.

Client computers 102 can also include at least one other client application that is configured to receive and/or send content between another computer. The client application can include a capability to send and/or receive content, or the like. The client application can further provide information that identifies itself, including a type, capability, name, and the like. In one embodiment, client computers 102 can uniquely identify themselves through any of a variety of mechanisms, including an Internet Protocol (IP) address, a phone number, Mobile Identification Number (MIN), an electronic serial number (ESN), or other device identifier. Such information can be provided in a network packet, or the like, sent between other client computers 102, Payment Entity Servers 103, 104, 105, Merchant Site Servers 106, 107, Platform Host Server Computer 112, and Manifest Site Server Computer 114, or other computers.

Client computers 102-105 can further be configured to include a client application that enables an end-user to log into an end-user account that can be managed by another computer, such as Payment Entity Servers 103, 104, 105, Merchant Site Servers 106, 107, Platform Host Server Computer (DSC) 112, and Manifest Site Server Computer (MSC) 114, or the like. Such end-user account, in one non-limiting example, can be configured to enable the end-user to manage one or more online activities, including, for example, search activities, social networking activities, browse various websites, communicate with other users, or the like. However, participation in such online activities can also be performed without logging into the end-user account.

Wireless network 108 is configured to couple client computers 103-105 and its components with network 110. Wireless network 108 can include any of a variety of wireless sub-networks that can further overlay stand-alone ad-hoc networks, and the like, to provide an infrastructure-oriented connection for client computers 103-105. Such sub-networks can include mesh networks, Wireless LAN (WLAN) networks, cellular networks, and the like. In one embodiment, the system can include more than one wireless network.

Wireless network 108 can further include an autonomous system of terminals, gateways, routers, and the like connected by wireless radio links, and the like. These connectors can be configured to move freely and randomly and organize themselves arbitrarily, such that the topology of wireless network 108 can change rapidly.

Wireless network 108 can further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks can enable wide area coverage for mobile devices, such as client computers 103-105 with various degrees of mobility. In one non-limiting example, wireless network 108 can enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 can include virtually any wireless communication mechanism by which information can travel between client computers 103-105 and another computer, network, and the like.

Network 110 is configured to couple network computers with other computers and/or computing devices, including Payor Entity Servers 103, 104, 105, Merchant Site Servers 106, 107, Platform Host Server Computer (DSC) 112, and Manifest Site Server Computer (MSC) 114, and client computers 102, including through wireless network 108. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks can utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links can further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 can be configured to transport information of an Internet Protocol (IP). In essence, network 110 includes any communication method by which information can travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Embodiments of Merchant Site Servers 106, 107, Platform Host Server Computer 112, and Manifest Site Server Computer 114 are described in more detail below in conjunction with FIGS. 10A-10B. Briefly, however, Merchant Site Servers 106, 107, Platform Host Server Computer 112, and Manifest Site Server Computer 114 each include virtually any network computer capable of performing the transactions and providing the interfaces described in more detail with respect to FIGS. 3-9B.

Figure 10A:
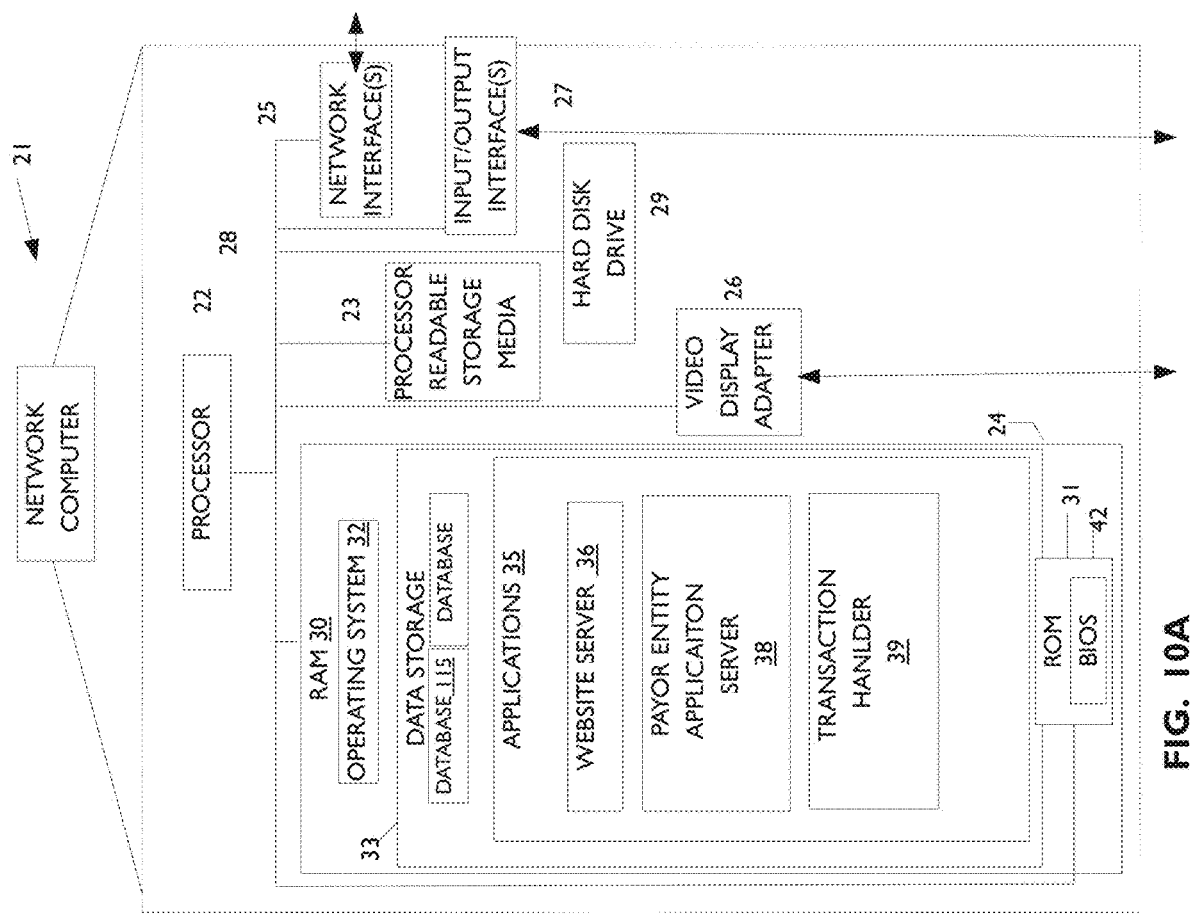
FIGS. 10A-10B show embodiments of a network computer.
Figure 10B:
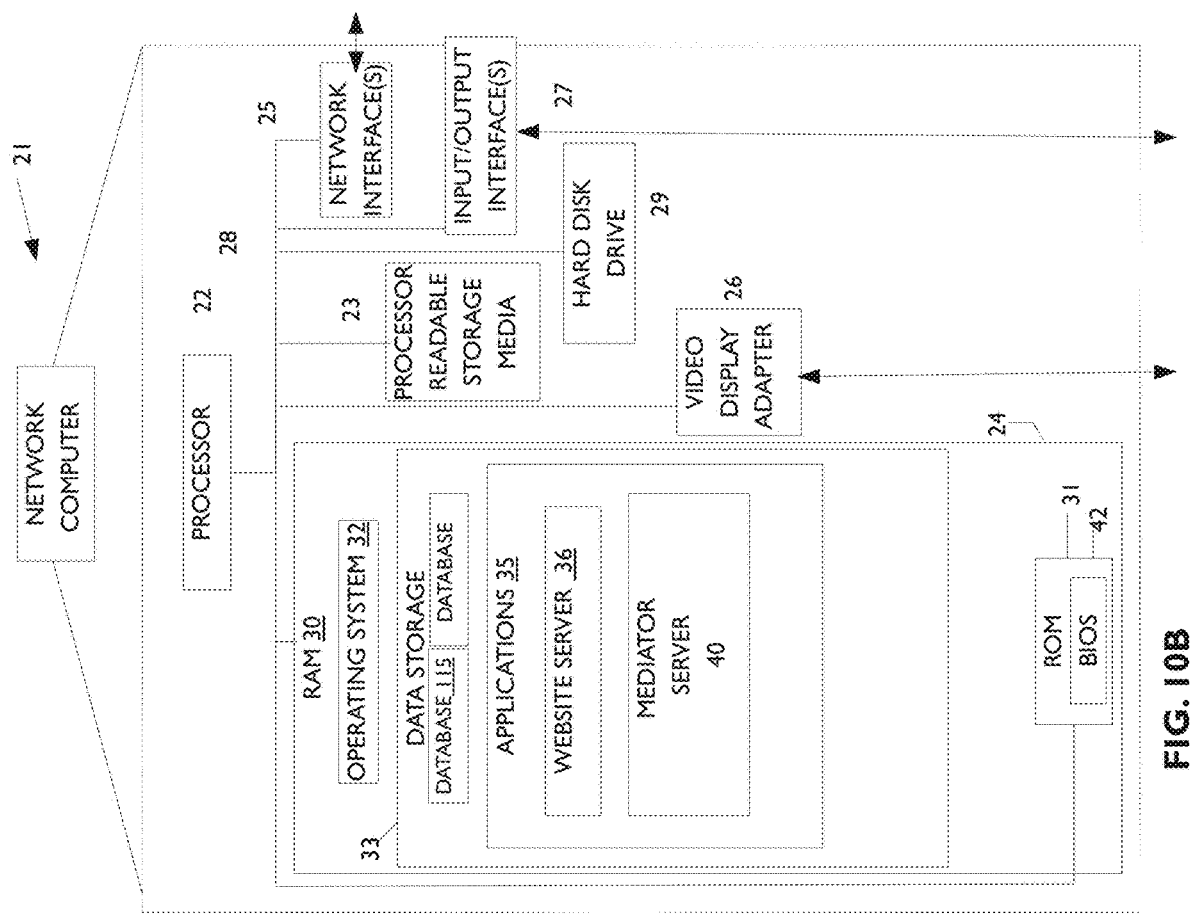

Although FIGS. 1 and 10A-10B illustrates the Payor Entity Servers 103, 104, 105, Merchant Site Servers 106, 107, Platform Host Server Computer 112, or Manifest Site Server Computer 114 as a single computer, the embodiments are not so limited. For example, one or more functions of a given server computer can be distributed across one or more distinct network computers. A given server computer an contain a plurality of network computers, for example, a plurality of network computers that operate using a master/slave approach, where one of the plurality of network computers is operative to manage and/or otherwise coordinate operations of the other network computers. In other embodiments, a server computer can operate as a plurality of network computers arranged in a cluster architecture, a peer-to-peer architecture, and/or within a cloud architecture. Thus, embodiments are not to be construed as being limited to a single environment, and other configurations, and architectures are also envisaged.

Although illustrated separately, Platform Server Computer 112 and Manifest Site Server Computer 114 can be employed as a single network computer, separate network computers, a cluster of network computers, or the like. In some embodiments, either Platform Server Computer 112 or Manifest Server Computer 114, or both, can be enabled to respond to user interactions with Payment Entity Servers 103, 104, 105, Merchant Site Servers 106, 107, and user client computers 102, and track client merchant interactions with cookies, update widgets and widgets controllers, or the like.

In at least one of the various embodiments, Platform Server Computer 112, can include one or more computers to host a Mediator Site and Manifest. In at least one of the various embodiments, hosting servers can be arranged to integrate with Manifest Server Computer 114.

As shown in FIG. 2, in at least one of the various embodiments, Manifest Server Computer 114 and Platform Server Computer 112 can be arranged to integrate and/or communicate with Payment Entity Servers 103, 104, 105, Merchant Site Servers 106, 107, user client computers 102, using API's or other communication interfaces provided by the services. For example, Payment Entity Servers 103, 104, 105 or Merchant Site Servers 106, 107 can offer a HTTP/REST based interface that enables to Manifest Server Computer 114 determine various events that can be associated with Manifest operations and cookies provided by the Server 114, as described in more detail with respect to FIGS. 3-9B. For another example, Merchant Site Servers 106, 107 can offer payment request interfaces or APIs to a user device 102 request payment at a checkout operation, and can open a payment handler interface or API to a Payment Entity Computer Server 103. In an embodiment, the Merchant Site Servers 106, 107 interface or API can include a registered service worker script validated by the Manifest Site Server for the purpose of validating digitally signed cookies on user devices and payment handlers on payment entity applications or website payment sheets as described herein. However, in an embodiment, only the platform host can have permission to write or update manifest files 116 to the Manifest database 115 on the Manifest Server Computer 114 so the platform can verify and authenticate payors as payment entities to a trusted platform.

One of ordinary skill in the art will appreciate that the architecture of system 100 is a non-limiting example that is illustrative of at least a portion of at least one of the various embodiments. As such, more or less components can be employed and/or arranged differently without departing from the scope of the innovations described herein. However, system 100 is sufficient for disclosing at least the innovations claimed herein.

Referring to the drawings and, in particular, FIGS. 1-2, a Mediator Website is served from a Manifest Server Computer 114. Manifest Server Computer 114 contains an updated database of payment entity registration with a platform host, for example, a payment card network. Payment entity information can include a unique identifier, a Wallet ID, mapped to each payment entity.

In an implementation of an exemplary Manifest Server Computer 114, any one or more of the client user computer devices 102 can implement a Web browsing application to generate a web browser user interface for display on a display device. A web browsing application can include a web browser, a browser plug-in, a browser add-on or extension, a browser toolbar, or any other application that may be implemented to browse the Web and web pages. The web browser user interface facilitates user device communication and interaction with other computer users and devices via the communication network 110.

Any one or more of the client user computer devices 102 can include various web browsing application(s) that can be modified or implemented to facilitate web browsing, and which can be included as part of a data path between a client computer device 102 and the communication network (e.g., the Internet). The web browsing application(s) include a web browser application, a firewall, an intranet system, and the like.

In an embodiment, unlike merchants, payment entities such as financial institutions (e.g. banks) do not have any products on their website for purchase. However, in an embodiment, all of these institutions can be registered with a Manifest Server Computer 114, so the Manifest Server Computer 114 can collect all legitimate URLs from these payment entities and then include the URLs in a Manifest database 115, which are mapped to the unique Wallet ID for each payment entity. The database can include both payment entity information for banks and financial institutions, as well as for other payors, for example, funding sites, peer-to-peer transfers, individuals, entities transacting with cryptocurrency, or indeed, any payor validated as a payment entity to the Manifest Server Computer 114 as described herein.

In an embodiment, the methods and systems of this disclosure can be associated, for example, with one or more of an electronic commerce interaction, an electronic auction interaction, a shopping interaction, or other interaction.

A Merchant Site Server 106, 107 can be characterized in part as one or more computing services that provide electronic commerce functionality either to e-commerce sites or directly to consumers. This can include, for example, electronic commerce procedures pertaining to one or more of the following: a sale of a good or service, a transaction, and/or a communication of information. E-commerce-related services can be deployed as integrated services such as a shopping website, or the services can be deployed in any number of configurations. For example, individual services can include a shopping cart, a credit card transaction engine, a product search engine, and a price or feature comparison engine, and so on, all of which can be combined in a deployment of an e-commerce website. It should be appreciated that a plurality of computing services can be provided concurrently or sequentially to support a particular transaction or user experience. It should also be appreciated that computing services can be delivered to multiple users and/or multiple instances of a single user with techniques such as multiprocessing, multithreading, and/or distributed computing.

The computing services can relate to sale of goods or services and websites associated therewith. This can include, without limitation, the following generally recognized categories of goods and services: adult, apparel, audio and video, automotive, baby, baby registry, wedding registry, beauty, bed and bath, books, camera and photo, cell phones and service, computer and video games, computers, digital books, educational electronics, streaming services, financial services, friends and favorites, furniture and decor, food, gourmet food, health and personal care, home and garden images, information, jewelry and watches, magazine subscriptions, maps, movie show times, music, musical instruments, office products, outdoor living, pet supplies, pharmaceuticals, real estate, shoes, software, sports and outdoors, tools and hardware, toys and games, travel, video, weather, wish list, and/or yellow pages.

The computing services can support transactions including, without limitation, one or more of the following: one-click shopping, an auction, an authentication, a "buy now" operation, a shopping cart operation, a currency transaction or exchange, a digital rights management operation, a payment, a permission, a micropayment, a cryptographic key generation or distribution, an encryption, and/or an identity or authority verification, and Websites associated therewith.

It should be understood that the embodiments described herein can relate to an interaction with a website, portion of a website, content associated with a website, content accessible through a network, information accessible through a network, a network accessible item, virtually any other network interaction, interactions with user interfaces, interactions with software applications, interactions with objects that are embedded in user interfaces or software applications (e.g., embedded URLs, links, or the like), or interactions with data or metadata that represent or are derived from or that relate to any of the foregoing.

Similarly, while many of the embodiments herein are described in connection with browser interfaces, it should be understood that embodiments as described herein can be used with any software that interacts with content through a network, including open source (e.g., Mozilla, Firefox, or other open source browser), peer-to-peer, distributed immutable ledger, proprietary (e.g., Microsoft's Internet Explorer, Apple's Safari, Google's Chrome), platform specific (e.g., using a protocol designed for a particular device), or other software, platforms, or configurations.

Figure 3:
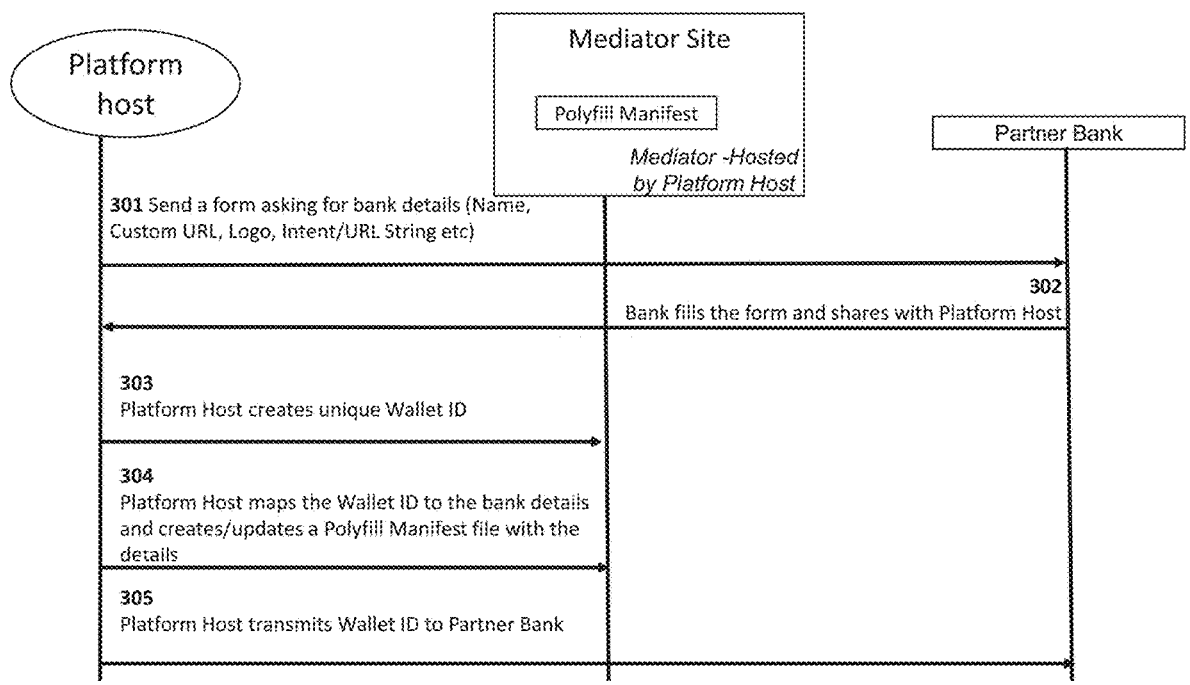
FIG. 3 is a flow for a process for onboarding a payment entity to a trusted platform and mediator website.

In an embodiment, FIG. 3 shows a flow for onboarding a payor entity as a trusted payment entity. In the embodiments described herein, the exemplary payment entity is a bank, however a payment entity can be any payor who is validated to the system and whose technology is configured to integrate into to the system. At block 301, the platform sends a form asking for bank details (e.g.: Name, Custom URL, Logo, Intent/URL String and so on). At block 302, the bank fills the form and returns it to the platform. At block 303, if not already done, the platform creates a unique ID, referred to as a Wallet ID herein. At block 304, the platform maps the Wallet ID to the bank information and creates or updates a Manifest file. In an embodiment, the Manifest file can be as JSON file. The Manifest File is stored to a Manifest kept on a secured site, database, or server that only the platform host is permissioned to write to, thereby providing the secure, trusted platform as described herein. The Manifest includes Manifest files with mapped Wallet IDs and information for multiple banks. This Manifest, called a "Polyfill Manifest" herein, can be hosted by the platform at a Mediator Site. At block 305, Wallet ID is distributed to the Bank.

Figure 4:
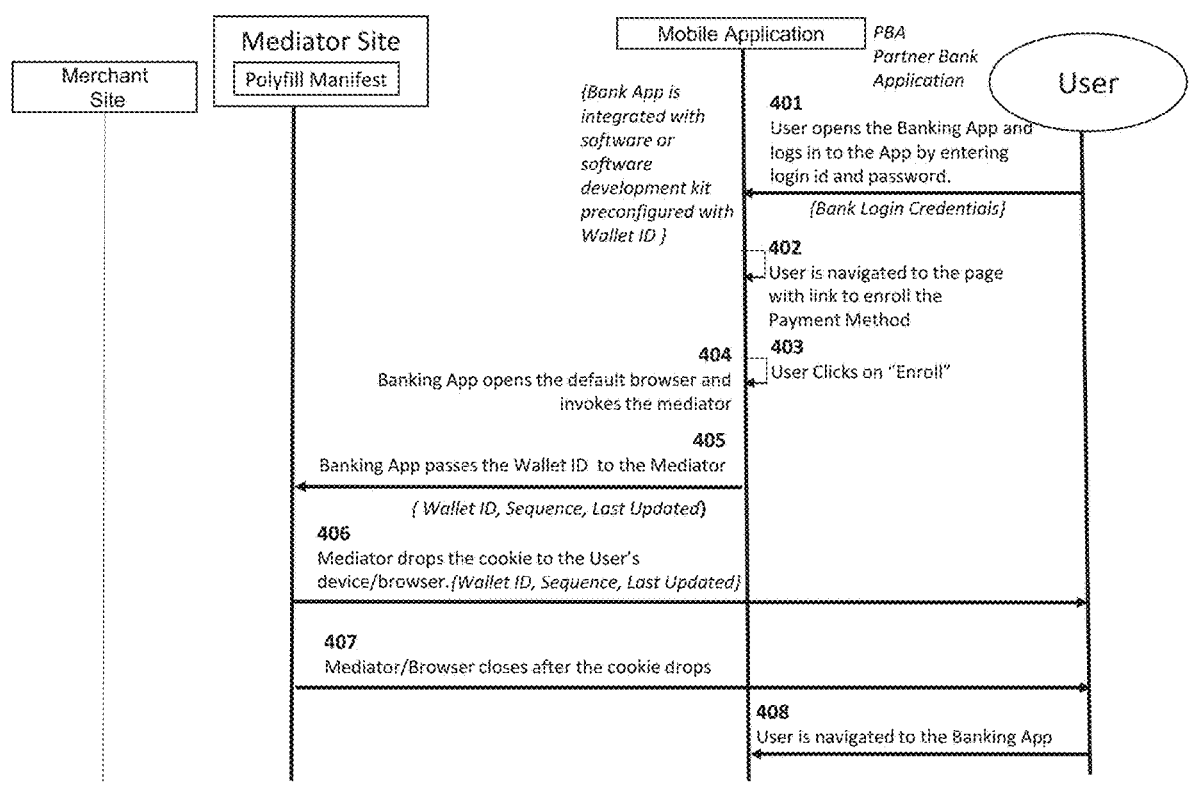
FIG. 4 is a flow for registering a payment entity with a user application on a mobile device.

In an embodiment, FIG. 4 shows a flow for registering a payment entity, again shown as a bank, with a user application on a mobile device. At block 401, a user opens a banking application and logs in to the application, for example, by entering a login ID and password. In an embodiment, the bank application is integrated with an application program preconfigured with the Wallet ID generated by the platform host as generated at block 303. At block 402, the bank application automatically navigates to a page with a link to enroll a payment method. At block 403, the user selects the link to enroll. At block 404, the banking application automatically opens the user device's default web browser and connects to a Mediator site. At block 405, the banking application sends Wallet ID to the Mediator site. In response, at block 406 the Mediator site transmits a digitally signed cookie with tracking data, including fields for the sequence of the banking application, and the last updated use. In an embodiment, the cookie can include a frequency field. A further description of the cookie is given with respect to FIG. 8. As described herein, the client device uses the tracking cookie to determine, inter alia, the display operation of a dynamic interface object 90, described in further detail with respect to FIG. 10. At block 407, after the bank is thus registered to the user and the user device, the Mediator browser interface instructs the web browser to close after the cookie is stored to the user client device, and at block 408, the user is navigated to the banking application.

Figure 5:
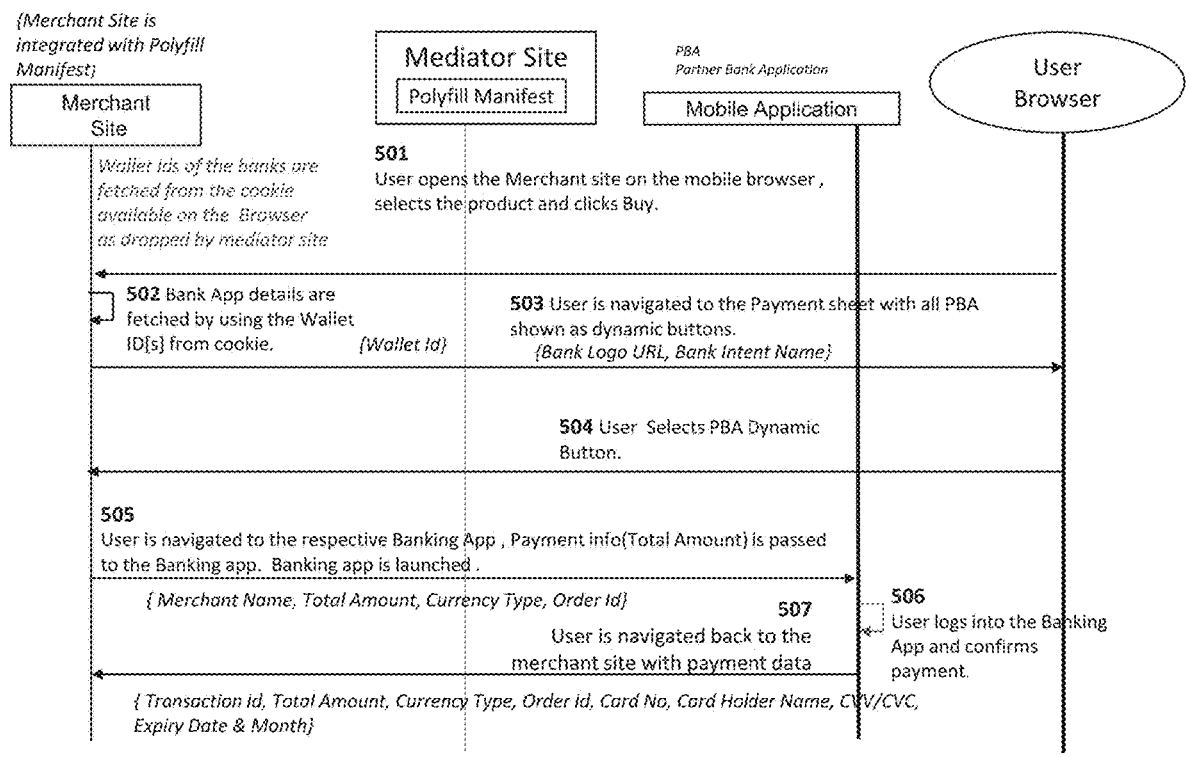
FIG. 5 shows a system flow between a user device, a merchant website, a mediator website, and a payment entity application for executing a payment transaction.

In an embodiment, FIG. 5 shows a system flow between a user device, a merchant site, a Mediator site, and a payment entity application, again shown as a bank application, for executing a payment transaction using the trusted platform. At block 501, the user connects to a merchant site on a mobile browser or via a special purpose merchant application, selects a product or service to purchase on the site, and starts a checkout process (e.g. clicks "Buy"). In an embodiment, the Manifest file at the Mediator site is integrated with the merchant application via an API or website browser on the user device.

At block 502, the Wallet IDs of the bank or banks are fetched from the digitally signed cookie available on the Browser as dropped by Mediator site at block 406. At block 503, banking application details are fetched by using one or more Wallet IDs from the Manifest. As noted above, the Manifest file at the Mediator site is integrated with the merchant application via an API or website browser on the user device. For example, a registered service worker script on the web browser displaying the merchant website on the user device is configured to interface with the digitally signed cookie information for the payment application details and interface with payment handler for the bank application or bank website.

At block 504, the browser automatically navigates to a payment sheet interface page. In an embodiment, bank information is shown as one or more dynamic interactive objects corresponding to the banks from one or more of the Wallet IDs from the cookie. In embodiments described herein, the dynamic interface object 90 is referred to as a button, but other dynamic interface objects 90 or icons can be employed. In an embodiment, each dynamic button is configured to display a Bank Logo, a Bank URL, and Bank Name for the Bank.

At block 505, the user selects the dynamic button for the bank he or she is using for payment. At block 506, the user device then opens the respective banking application invoked by the dynamic button, and the payment transaction information is transmitted to the banking application from the merchant site. For example, the merchant site sends the Merchant Name, Total Amount, Currency Type, and Order Id to the banking application. At block 507, the user confirms the transaction on the banking application, and at block 508 the Banking Application sends the payment information to the merchant website (e.g.: Transaction ID, Total Amount, Currency Type, Order Id, Card No, Card Holder Name, CVV/CVC, Expiry Date and Month).

As will be appreciated, the mediator site and manifest filer together with the cookie and dynamic interface object act as a gatekeeper. On exemplary advantage of the technological architecture is that it protects the user device from being attacked by malicious software, for example, from a phishing attack or malicious application. Conventionally, when a user clicks on a merchant website for a transaction, the website or an application broadcasts a message to the browser to look for any supported payment applications. Malicious applications can be readily configured to respond to this broadcast. The malicious application then gets registered to the user device to phish or open to fake, malicious websites and networks. However, as shown above, when the merchant page presents payment options using the embodiments described herein, it is checked against the manifest and the validated cookie on the user device, assuring only approved applications can submit payments to the merchant. Because the validated and signed cookie is mapped to bank information at the manifest file, no phishing or impersonator can register as a valid payment option. The manifest thus serves as gatekeeper to assure user application is a permitted application.

Figure 6:
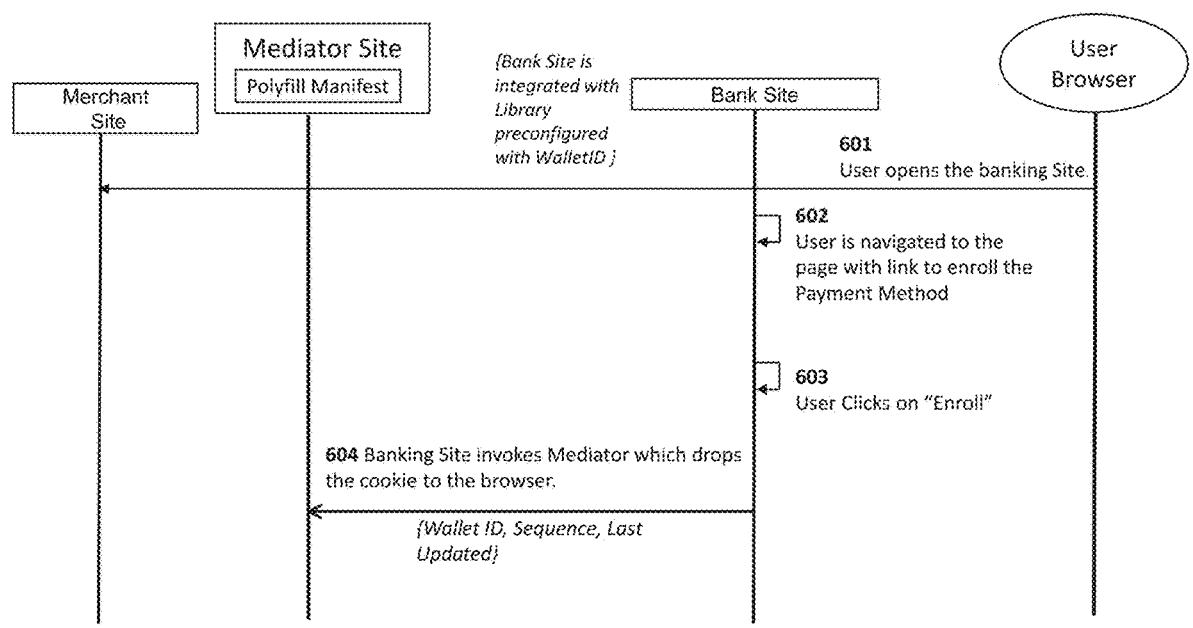
FIG. 6 shows a flow for registering a payment entity to a client user with a web browser.

In an embodiment, FIG. 6 shows a flow for registering a payor as a payment entity, again shown as a bank, to a client computer using a web browser for a client user. At block 601, a user opens a web browser on their device and navigates to a bank website. In an embodiment, the browser can be integrated with the Manifest file preconfigured with the Wallet ID generated by the Mediator site. At block 602, the bank website automatically navigates to a page with a link to enroll a payment method. At block 603, the user selects the link to enroll. At block 604, the bank website connects to the Mediator site. At block 605, the bank website sends Wallet Id to the Mediator site. In response, at block 606 the Mediator site transmits a cookie to the user's web browser, the cookie having tracking data including the fields for the sequence of the banking application, and the last updated use. The cookie can also include a Frequency field for frequency of use.

Figure 7:
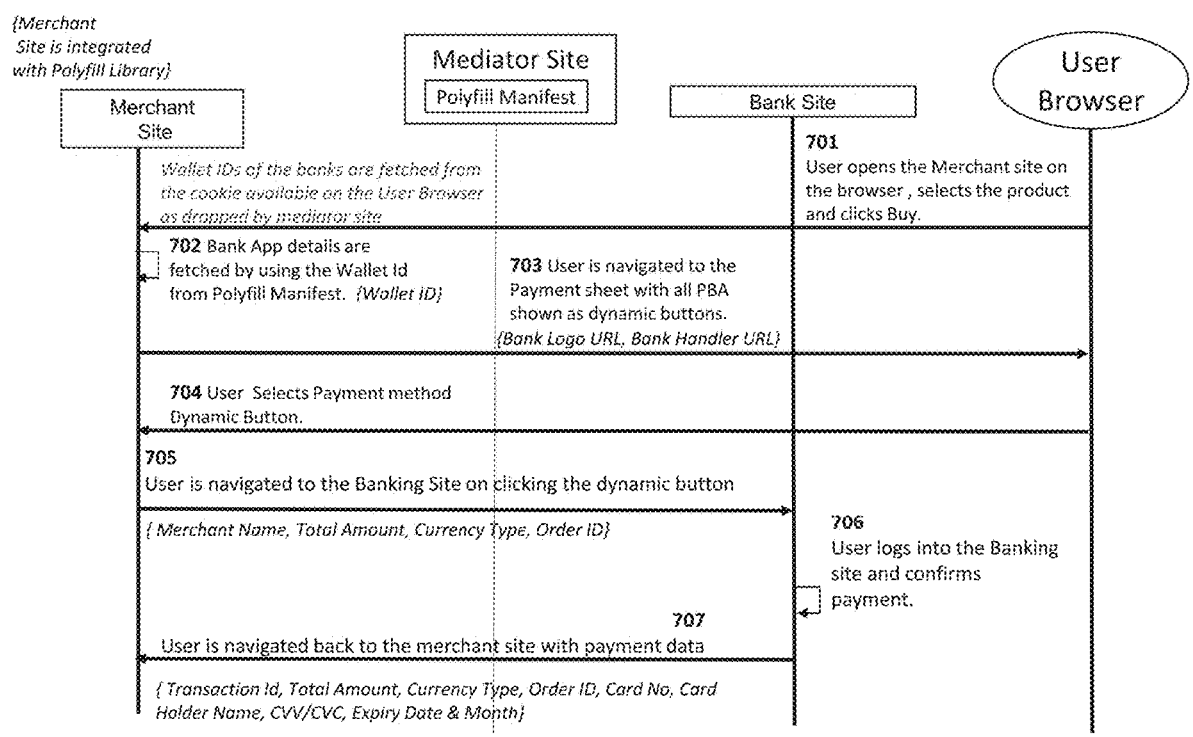
FIG. 7 shows a system flow between a user device, a merchant website, a mediator website, and a payment entity website for executing a payment transaction.

In an embodiment, FIG. 7 shows a system flow between a user device web browser, a merchant site, a Mediator site, and a payment entity website, shown as a bank website, for executing a payment transaction using the trusted platform. At block 701, the user connects to a merchant site on a web browser, selects a product or service, and starts a checkout process (e.g. clicks "Buy"). In an embodiment, the Manifest file is integrated with the merchant website via the user browser, for example, via a registered service worker script as described herein. At block 702, the Wallet IDs of the bank or banks are fetched from the cookie available on the browser as dropped by Mediator site at block 606. The banking application details are fetched by using one or more Wallet IDs from the Manifest. At block 703, the browser automatically navigates to a payment sheet interface page with all bank information shown as one or more dynamic button icons corresponding to the banks from the one or more Wallet IDs from the cookie. In an embodiment, each dynamic button is configured to display bank information (e.g.: a bank logo, a bank URL, bank name for the bank). At block 704, the user selects the dynamic button for the bank he or she is using for payment. At block 705, the user device browser then automatically navigates to the bank webpage invoked by the dynamic button, and the payment transaction information is transmitted to the bank website from the merchant site. For example, the banking website sends the Merchant Name, Total Amount, Currency Type, and Order Id to the banking website. At block 706, the user confirms the transaction on the banking website, and at block 707 the banking website sends the payment information to the merchant website (e.g.: Transaction Id, Total Amount, Currency Type, Order Id, Card No, Card Holder Name, CVV/CVC, Expiry Date and Month).

In an embodiment, a dynamic interface object 90 for an application or web browser comprises an interface object coded to display payor information for the payment entity associated with a Manifest file, including payor information for one of a plurality of payment entities. In an embodiment, a client device can be configured to support a plurality of payment entity applications configured to interface with the dynamic interface object 90. In the embodiment, where the client or user device or interface 30 is configured with the plurality of configured payment entity applications, the dynamic interface object 90 is configured to default to the payment entity application or that was last used to transact with a merchant. In an embodiment, the dynamic interface object 90 is configured to access master cookie data on a client device that was provided by a platform host. As described herein, the master cookie is generated and transmitted to the client device by a trusted platform. The master cookie is configured to allow a user device and a merchant website to securely identify and transact with a payment entity application or a payment entity website. In an embodiment, the cookie includes information that allows the application and/or web browser to determine which information to display in the payment entity application and on the merchant website served to the client device's web browser.

Thus again, the Mediator site and Manifest file act as a gatekeeper, offering a technological architecture that protects the user device from being attacked by malicious software, for example, from a phishing attack or malicious application.

Figure 8:
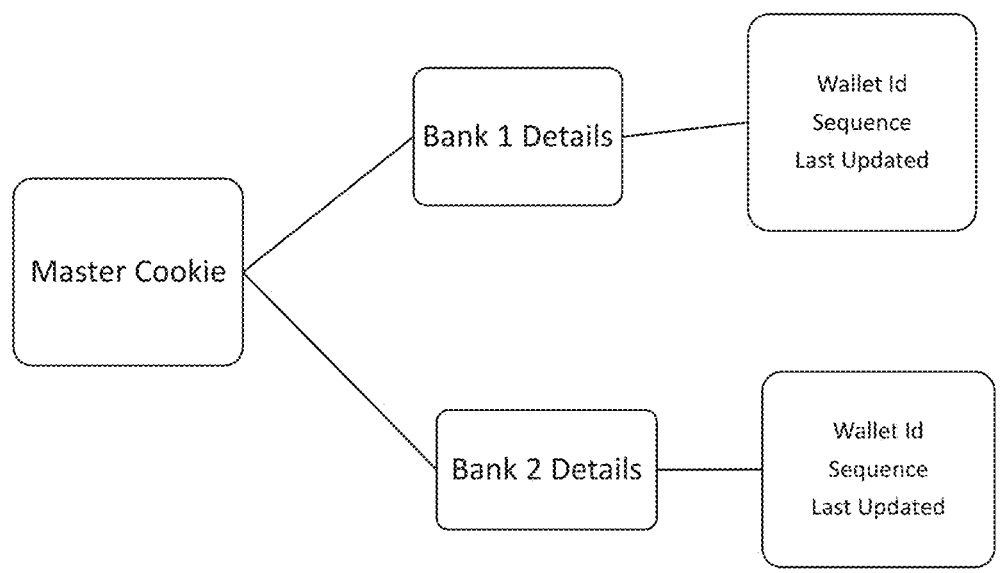
FIG. 8 shows a hierarchy for a cookie structure for a master cookie dropped to a client device from a mediator website.

In an embodiment, FIG. 8 shows a hierarchy for a cookie structure for a master cookie that is digitally signed, transmitted and stored to a client device for a user by the platform host. The master cookie is configured to allow the user device and a merchant website to securely identify and transact with a payment entity application or a payment entity website as described herein. The master cookie is also configured to integrate with a web browser interface or a payment entity application to dynamically generate an operable a dynamic interface object 90, referred to herein as a dynamic button. The dynamic interface object 90 changes its operation and appearance based on the cookie data, thus providing an intuitive interface object 90 for a user to transact securely with the payment entity on the merchant website.

In the embodiment, the master cookie is configured to include payor details for a plurality of payment entities. The cookie includes, for each payment entity, a Wallet ID field configured to include the Wallet ID to uniquely identify the payment entity by the platform host and registered by the user. The master cookie also includes, for each payment entity, a Sequence field configured to identify the sequence of the dynamic button for that payment entity and a Last Updated field configured to update the time entry for when the payment entity was used for a transaction operation. The validated cookie information for the master cookie can also include, for each payment entity, a Frequency field (not shown) showing how many times each payment entity's application has been used for a transaction for a given time period (e.g. each week, each month, every 4 months, each year, the life of the application/cookie information). Table 1 gives an exemplary structure for each payor entities' cookie data on a master cookie.

TABLE 1

| Field | Description | Exemplary Data |
|---|---|---|
| Wallet Id | Unique Identifier for the registered bank | c51d9450-2e01-11e9-b210-d663bd873d93 |
| Sequence | Sequence of the Dynamic Button in the List | 1 |
| Last Updated | Updated Time of the bank entry in the cookie | Feb. 18, 2019 |

Figure 9B:
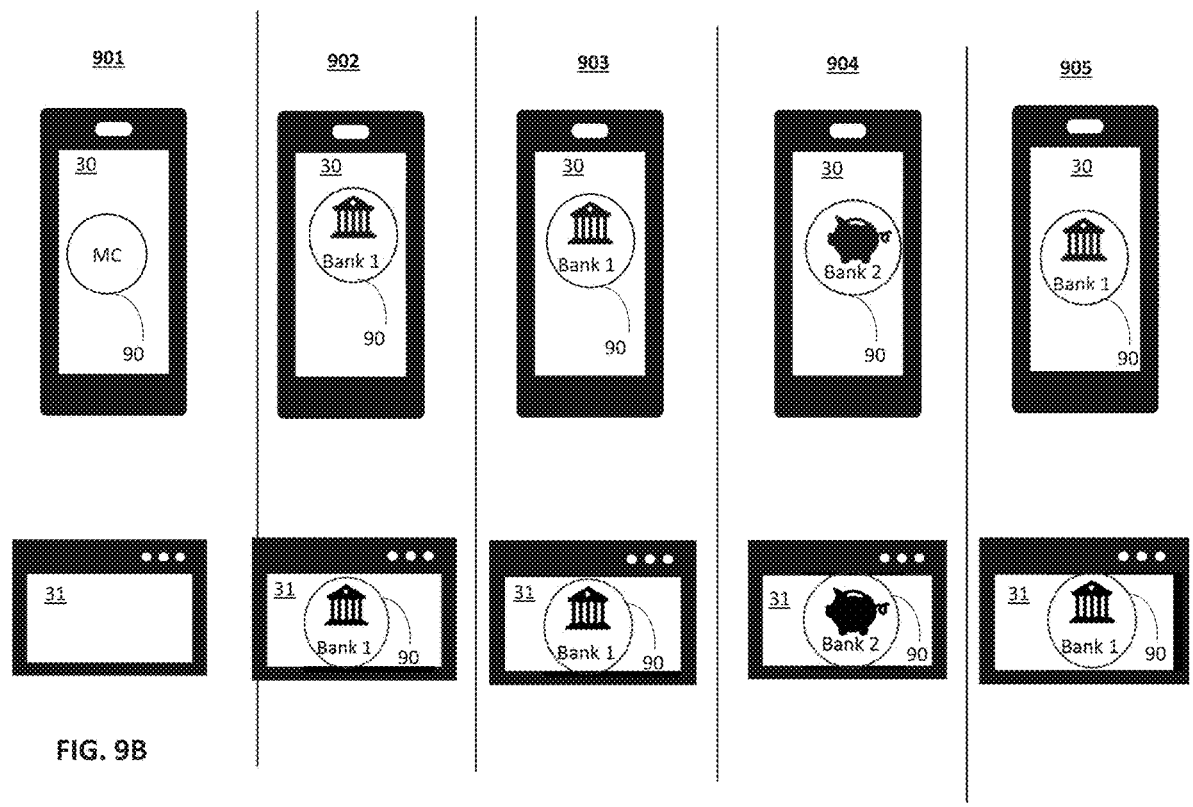
FIG. 9B shows user interfaces on a client device and a web-based payment sheet in accordance with the outcomes of FIG. 9A.

In an embodiment, FIG. 9A shows a matrix of outcomes for a merchant site and a client user employing a dynamic interface object 90. FIG. 9B shows user interfaces 30 on a client device 102 and a web browser payment sheet 31 in accordance with the outcomes of FIG. 9A. A UI 30 presented to the user 102 during a user client computer 102 purchase journey through a payment request API is called the payment sheet 31. The payment sheet 31 can, for example, be a World Wide Web Consortium (W3C) payment sheet, or other browser-based payment API or script. For example, in an embodiment, an exemplary payment sheet can include a javascript API payment request. A payment sheet can also include a payment sheet user interface provided and hosted from the merchant site. The payment sheet's 31 implementation can depend on a browser vendor for a merchant server computer 103, which means that the experience might differ from one browser to another. The outcomes can depend on whether the client user device 102 includes one or more payor entity applications configured to interoperate with the dynamic checkout operation. Accordingly the master cookie enables the client device to provide a dynamic button that displays consistently across web browsers or payment applications provided by banks. The master cookie also allows the dynamic interface object 90 to display and link to the correct payment entity.

FIG. 9B shows graphical user interfaces for a payment journey in accord with at least one of the various embodiments. In at least one of the various embodiments, user interfaces other than user interfaces 901, 902, 903, 904, 905, 30 or 31 can be employed without departing from the spirit and/or scope of the claimed subject matter. Such user interfaces can have more or fewer user interface elements, which can be arranged in various ways. In embodiments, user interfaces can be generated using web pages, mobile applications can include processes and/or API's for generating user interfaces, such as, user interfaces 901, 902, 903, 904, 905, 30 or 31.

Block 901 shows the outcomes for a user device transacting on a merchant website when no configured payment entity applications are installed or recognized on the device. At block 901a, a user device interacts with a merchant website, however the user device does not have any bank applications configured for the dynamic checkout operation. At blocks 901b and 901c, as no bank application is installed, the dynamic interface object 90 displays a generic, nondescript payment button, showing, for example no logo or the platform host's logo. On the merchant website, the payment sheet does not have any bank data and does not indicate any payor entity applications are supported.

Block 902 shows the outcomes for a user device transacting on a merchant website where the device has only one installed payment entity application configured for the dynamic interactive interface transaction prior to checking out for a transaction on the merchant web site. At block 902a, as only one bank application is installed, the dynamic interface object 90 displays the bank's information in the button, showing, for example, a logo and an indicia that the entity is part of the platform host's trusted network. At block 902d, the payment sheet defaults to the bank corresponding to the bank application. As there is no other installed application, the data for a second bank application at block 902c is moot.

Block 903 shows the outcomes for a user device transacting on a merchant website where the device has installed a second payment entity application configured for the dynamic interactive interface transaction prior to checking out for a transaction on the merchant web site. As the payment entity application has not yet been used for payment, at block 903a, the dynamic interface object 90 displays the first bank's information in the button. Although the second bank application has been installed, as it has never been used, the decisioning for a second bank application at block 903c still does not use the second bank's information for the dynamic interface object 90. For instance, the digitally signed cookie data sent from the user device indicates that the second bank associated with the second Wallet ID is not the most recently updated, and is lower in sequence than the those for the first bank's Wallet ID. Similarly, at block 903d, the payment sheet still defaults to the first bank corresponding to the first bank application.

Block 904 shows the outcomes for a user device transacting on a merchant website where the device has installed and most recently executed a transaction using the second payor entity application configured for the dynamic interactive interface transaction. At the prior transaction, the cookie data for the user device is updated to indicate the second bank associated with the second Wallet ID is most recently updated, and is higher in sequence than those for the first bank's Wallet ID. As the second application was the last used for payment, at block 904c, the dynamic interface object 90 displays the second bank's information in the button. At block 904b, the first bank is now not displayed on the dynamic interface object 90, as it is not the most recently used. Similarly, at block 904d, the payment sheet changes the default to the second bank corresponding to the second bank application.

Block 905 shows the outcomes for a user device transacting on a merchant website where the device has most recently executed a transaction using the second payor entity application, but then a user deletes the second application prior to a next transaction. When the second application is deleted from the user device, the cookie data for the user device is updated to indicate the second bank application has been deleted from the device. Even though the second application was the last used for payment, at block 905c, as the second application is deleted, the dynamic interface object 90 no longer displays the second bank's information in the button. At block 905b, the first bank is again displayed on the dynamic interface object 90, as it is again the only compatible bank application on the user device and is made the highest in Sequence. Similarly, at block 905d, the payment sheet changes the default to the first bank corresponding to the second first application.

In the examples above, the Sequence field of the cookie data is updated based on recency tracking, namely, where the Last Updated payment entity used for a transaction is highest in sequence, or the latest payment application activity indicates it is lower in sequence (e.g. the application is deleted). In another embodiment, the Sequence field of the cookie can be updated based on frequency tracking. The user device can be configured to update the sequence of the cookie data for each payment entity based on which application or entity payment sheet is used the most, regardless of which payment entity was most recently used for a transaction. The cookie information for the master cookie can include, for each payment entity, a Frequency field showing how many times the payment entity's application or payment sheet has been Last Updated for a transaction for a given time period (e.g. each week, each month, every 4 months, each year, the life of the application/cookie information). The Sequence field can then be updated to rank highest the payment entity whose Last Update transaction frequency in the Frequency field is highest, or highest within the given the time period. Based on the Sequence field, the dynamic interface object 90 of the user device thus displays the payment entity's information in the button whose transaction frequency is highest, or highest within the given the time period.

Illustrative Network Computer

FIGS. 10A-10B show embodiments of a network computer 21 according to one embodiment of the present disclosure. Network computer 21 can include many more or less components than those shown. The components shown, however, are sufficient to disclose an illustrative embodiment for practicing the invention. Network computer 21 can be configured to operate as a server, client, peer, a host, or any other computer. Network computer 21 can represent, for example Payment Entity Server Computers 103, 104, 105, Merchant Site Server Computers 106, 107, Platform Host Server Computer 112, and Manifest Site Server Computer 114, and/or other network computers.

Network computer 21 includes processor 22, processor readable storage media 23, network interface unit 25, an input/output interface 27, hard disk drive 29, video display adapter 26, and memory 24, all in communication with each other via bus 28. In some embodiments, processor 22 can include one or more central processing units.

As illustrated in FIGS. 10A-10B, network computer 21 also can communicate with the Internet, or some other communications network, via network interface unit 25, which is constructed for use with various communication protocols including the TCP/IP protocol. Network interface unit 25 is sometimes known as a transceiver, transceiving device, or network interface card (NIC).

Network computer 21 also comprises input/output interface 27 for communicating with external devices, such as a keyboard, or other input or output devices not shown in FIGS. 10A-10B. Input/output interface 27 can utilize one or more communication technologies, such as USB, infrared, Bluetooth™, or the like.

Memory 24 generally includes a Random Access Memory (RAM) 54, a Read Only Memory (ROM) 55 and one or more permanent mass storage devices, such as hard disk drive 29, tape drive, optical drive, and/or floppy disk drive. Memory 24 stores operating system 32 for controlling the operation of network computer 21. Any general-purpose operating system can be employed. Basic input/output system (BIOS) 42 is also provided for controlling the low-level operation of network computer 21.

Although illustrated separately, memory 24 can include processor readable storage media 23. Processor readable storage media 23 can be referred to and/or include computer readable media, computer readable storage media, and/or processor readable storage device. Processor readable storage media 23 can include volatile, non-volatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media that can be used to store the desired information and which can be accessed by a computer.

Memory 24 further includes one or more data storage 33, which can be utilized by network computer 21 to store, among other things, applications 35 and/or other data. For example, data storage 33 can also be employed to store information that describes various capabilities of network computer 21. The information can then be provided to another computer based on any of a variety of events, including being sent as part of a header during a communication, sent upon request, or the like. Data storage 33 can also be employed to store messages, web page content, or the like. At least a portion of the information can also be stored on another component of network computer 21, including, but not limited to processor readable storage media 23, hard disk drive 29, or other computer readable storage medias (not shown) within client computer 21.

Data storage 33 can include a database, text, spreadsheet, folder, file, or the like, that may be configured to maintain and store user account identifiers, user profiles, email addresses, IM addresses, and/or other network addresses; or the like.

In at least one of the various embodiments, data storage 33 can include databases, for example, as shown in FIG. 10B, Manifest database 115, and other databases that can contain information determined from cookie object tracking and payor entity record data as described herein.

Data storage 33 can further include program code, data, algorithms, and the like, for use by a processor, such as processor 22 to execute and perform actions. In one embodiment, at least some of data store 33 might also be stored on another component of network computer 21, including, but not limited to processor-readable storage media 23, hard disk drive 29, or the like.

Applications 35 can include computer executable instructions, which can be loaded into mass memory and run on operating system 32. Examples of application programs can include transcoders, schedulers, calendars, database programs, word processing programs, Hypertext Transfer Protocol (HTTP) programs, customizable user interface programs, IPsec applications, encryption programs, security programs, SMS message servers, IM message servers, email servers, account managers, and so forth. Applications can also include a website server 36. As shown in FIG. 10A, in Payment Entity Server Computers 103, 104, 105, Applications 35 can also include a Payor Entity Application Server 38 and a transaction hander 39. As shown in FIG. 10B, in a Platform Host Server Computer 112 or Manifest Site Server Computer 114, applications 35 can also include a Mediator server 40.

Website server 36 can represent any of a variety of information and services that are configured to provide content, including messages, over a network to another computer. Thus, website server 36 can include, for example, a web server, a File Transfer Protocol (FTP) server, a database server, a content server, or the like. Website server 36 can provide the content including messages over the network using any of a variety of formats including, but not limited to WAP, HDML, WML, SGML, HTML, XML, Compact HTML (cHTML), Extensible HTML (xHTML), or the like.

Payment Entity Server Application 38 can be hosted and operative on Payment Entity Server Computers 103, 104, 105. In at least one of the various embodiments, Payment Entity Sever Application can employ processes, or parts of processes, similar to those described in conjunction with FIGS. 1-9B to perform at least some of its actions. The Payment Entity Server Application serves a client-side Payment Entity Client Application that is integrated with software preconfigured with a Wallet ID.

Mediator Server Application 40 can be hosted and operative on Platform Host Server Computer 112 and/or Manifest Site Server Computer 114. Mediator Server Application 40 can employ processes, or parts of processes, similar to those described in conjunction with FIGS. 1-9B to perform at least some of Manifest Site Server Computer 114 actions, including manifest creation and updating and cookie creation and transmission.

Illustrative Client Computer

Figure 11:
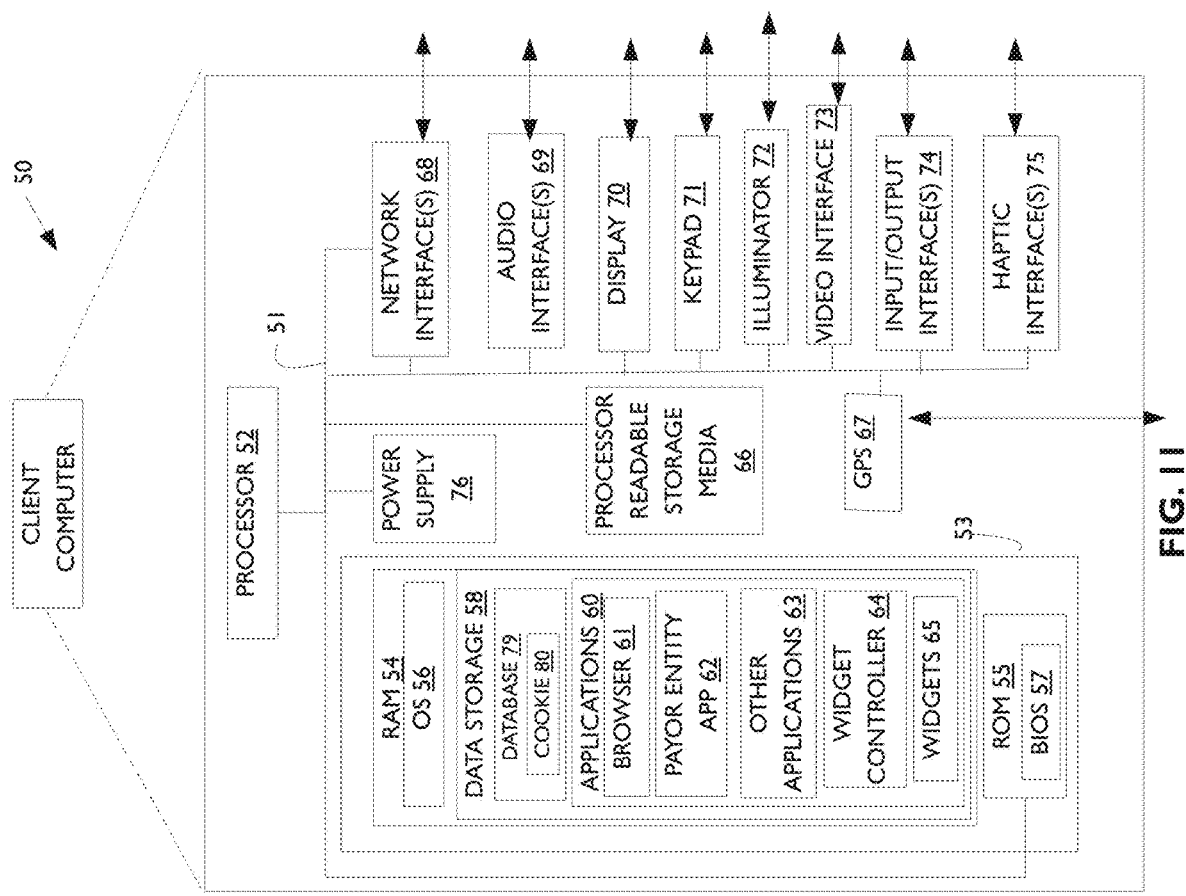
FIG. 11 shows an embodiment of a client computer.

FIG. 11 shows a Client Computer 50 according to one embodiment of the present disclosure. Client Computer 50 can include many more or less components than those shown in FIG. 11. However, the components shown are sufficient to disclose an illustrative embodiment for practicing the present invention.

Client Computer 50 can represent, for example, one embodiment of at least one of Client Computers 102 of FIG. 1.

As shown in the FIG. 11, Client Computer 50 includes a processor 52 in communication with a mass memory 53 via a bus 51. In some embodiments, processor 50 includes one or more central processing units (CPU). Client Computer 50 also includes a power supply 76, one or more network interfaces 68, an audio interface 69, a display 70, a keypad 71, an illuminator 72, a video interface 73, an input/output interface 74, a haptic interface 75, and a global positioning system (GPS) receiver 67.

Power supply 76 provides power to Client Computer 51. A rechargeable or non-rechargeable battery can be used to provide power. The power can also be provided by an external power source, such as an alternating current (AC) adapter or a powered docking cradle that supplements and/or recharges a battery.

Client Computer 50 can optionally communicate with a base station (not shown), or directly with another computer. Network interface 68 includes circuitry for coupling Client Computer 50 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 68 is sometimes known as a transceiver, transceiving device, or network interface card (NIC).

Audio interface 69 is arranged to produce and receive audio signals such as the sound of a human voice. For example, audio interface 69 can be coupled to a speaker and microphone (not shown) to enable telecommunication with others and/or generate an audio acknowledgement for some action.

Display 70 can be a liquid crystal display (LCD), gas plasma, light emitting diode (LED), organic LED, or any other type of display used with a computer. Display 70 can also include a touch sensitive screen arranged to receive input from an object such as a stylus or a digit from a human hand.

Keypad 71 can comprise any input device arranged to receive input from a user. For example, keypad 71 can include a push button numeric dial, or a keyboard. Keypad 71 can also include command buttons that are associated with selecting and sending images. Illuminator 72 can provide a status indication and/or provide light. Illuminator 72 can remain active for specific periods of time or in response to events. For example, when illuminator 72 is active, it can backlight the buttons on keypad 72 and stay on while the Client Computer is powered. Also, illuminator 72 can backlight these buttons in various patterns when particular actions are performed, such as dialing another client computer. Illuminator 72 can also cause light sources positioned in a transparent or translucent case of the client computer to illuminate in response to actions.

Video interface 73 is arranged to capture video images, such as a still photo, a video segment, an infrared video, or the like. For example, video interface 73 can be coupled to a digital video camera, a web-camera, or the like. Video interface 73 can comprise a lens, an image sensor, and other electronics. Image sensors can include a complementary metal-oxide-semiconductor (CMOS) integrated circuit, charge coupled device (CCD), or any other integrated circuit for sensing light.

Client computer 50 also comprises input/output interface 74 for communicating with external devices, such as a headset, or other input or output devices not shown in FIG. 11. Input/output interface 74 can utilize one or more communication technologies, such as USB, infrared, Bluetooth™, or the like.

Haptic interface 75 is arranged to provide tactile feedback to a user of the client computer. For example, the haptic interface 75 can be employed to vibrate client computer 75 in a particular way when another user of a computing computer is calling. In some embodiments, haptic interface 75 is optional.

Client computer 50 can also include GPS transceiver 67 to determine the physical coordinates of client computer 50 on the surface of the Earth. GPS transceiver 67, in some embodiments, is optional. GPS transceiver 67 typically outputs a location as latitude and longitude values. However, GPS transceiver 67 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 50 on the surface of the Earth. It is understood that under different conditions, GPS transceiver 67 can determine a physical location within millimeters for client computer 50. In other cases, the determined physical location may be less precise, such as within a meter or significantly greater distances. In one embodiment, however, client computer 50 can, through other components, provide other information that can be employed to determine a physical location of the computer, including for example, a Media Access Control (MAC) address, IP address, or the like.

Mass memory 53 includes a Random Access Memory (RAM) 54, a Read-only Memory (ROM) 55, and other storage means. Mass memory 53 illustrates an example of computer readable storage media (devices) for storage of information such as computer readable instructions, data structures, program modules or other data. Mass memory 53 stores a basic input/output system (BIOS) 57 for controlling low level operation of client computer 50. Mass memory 53 also stores an operating system 56 for controlling the operation of client computer 50. It will be appreciated that this component can include a general-purpose operating system such as a version of UNIX, or LINUX™, or a specialized client communication operating system such as Microsoft Corporation's Windows™ OS, Apple Corporation's iOS™, Google Corporation's Android™ or the Symbian® operating system. The operating system can include, or interface with a Java virtual machine module that enables control of hardware components and/or operating system operations via Java application programs.

Mass memory 53 further includes one or more data storages 58 that can be utilized by client computer 50 to store, among other things, applications 60 and/or other data. For example, data storage 58 can also be employed to store information that describes various capabilities of client computer 50. The information can then be provided to another computer based on any of a variety of events, including being sent as part of a header during a communication, sent upon request, or the like. Data storage 58 can also be employed to store social networking information including address books, buddy lists, aliases, user profile information, or the like. Further, data storage 58 can also store message, web page content, or any of a variety of user generated content. At least a portion of the information can also be stored on another component of client computer 50, including, but not limited to processor readable storage media 66, a disk drive or other computer readable storage devices (not shown) in client computer 50. Data Storage can also include databases 79, including a database for storing a master cookie 80 from a Mediator site as described herein.

Processor readable storage media 66 can include volatile, non-volatile, removable, and non-removable media implemented in any method or technology for storage of information, such as computer or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium that can be used to store the desired information and which can be accessed by a computer. Processor readable storage media 66 is also referred to herein as computer readable storage media and/or computer readable storage device.

Applications 60 can include computer executable instructions which, when executed by client computer 50, transmit, receive, and/or otherwise process network data. Network data includes, but is not limited to, messages (e.g. SMS, Multimedia Message Service (MMS), instant message (IM), email, and/or other messages), audio, video, and enable telecommunication with another user of another client computer.

Applications 60 can include, for example, browser 61, payor entity application 62 and other applications 63. Other applications 63 include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Browser 61 can include virtually any application configured to receive and display graphics, text, multimedia, messages, and the like, employing virtually any web-based language. In one embodiment, the browser application employs HDML, WML, WMLScript, JavaScript, JSON, SGML, HTML, XML, and the like, to display and send a message. However, any of a variety of other web-based programming languages can be employed. In one embodiment, browser 61 enables a user of client computer 102 to communicate and interface with another network computer, such as Payment Entity Server Computers 103, 104, 105 Merchant Site Servers 106, 107, Platform Host Server Computer 112, or Manifest Site Server Computer 114, such that a user can accept cookies and operate a user interface 30 including a dynamic interface object 90 as described herein as described herein.

Applications 60 can also include Widget Controller 64 and one or more Widgets 65. Widgets 65 can be collections of content provided to the client computer by Merchant Site Servers 106, 107, Platform Host Server Computer 112, Payment Entity Server Computers 103, 104, 105, or Manifest Site Server Computer 114. Widget Controller 63 can be a program provided to the client computer by Merchant Site Servers 106, 107, Platform Host Server Computer 112, Payment Entity Server Computers 103, 104, 105, or Manifest Site Server Computer 114 and Widgets 65 can run as native client computer applications such as payment entity application 62 or they can run in Browser 61 as web browser based applications. Also, Widget Controller 64 and Widgets 65 can be arranged to run as native applications or web browser applications, or combination thereof. In one embodiment, browser 61 or payment entity application 62 employs Widget Controller 64 and Widgets 65 to enable a user of client computer 50 to communicate and interface with another network computer, such as Merchant Site Servers 106, 107, Platform Host Server Computer 112, or Manifest Site Server Computer 114 of FIGS. 1-2 such that a user can accept cookies and operate a user interface 30 including a dynamic interface object 90 as described herein.

All such modifications and adaptations as would be clear to one of skill in the art are intended to fall within the scope of the systems and methods described herein.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the disclosure.

In addition, as used herein, the term "or" is an inclusive "or" operator, and is equivalent to the term "and/or" unless the context clearly dictates otherwise. The term "based on" is not exclusive and allows for being based on additional factors not described, unless the context clearly dictates otherwise. In addition, throughout the specification, the meaning of "a" "an" and "the" include plural references. The meaning of "in" includes "in" and "on".

As used herein, the term "widget controller" refers to a computer program that may be operative on a client application. Widget controllers may be downloaded and/or otherwise deployed to a client application. Widget controllers can be arranged to be operative for downloading content, monitoring consumer actions, or otherwise managing widgets located within client applications.

As used herein, the term "widget" refers to a user-interface element located in the client application. Widgets can be invisible or visible to users of the client applications. In some cases, a widget controller can generate widget "on-the-fly" before deploying content into the widget. Widgets can be adapted to reflect the operating environment of the client application that they are being hosted within. For example, in clients that support HTML, CSS a widget can be an HTML element such as a DIV, P, or the like. For client application operative in a Java environment, a widget may be a JavaScript Object Notation (JSON) element, a View object or Window object, and so on.

As used herein, the term "Host" may refer to an individual person, partnership, organization, or corporate entity that may own or operate one or more trusted platforms (e.g., web sites, mobile applications, or the like). Hosts can arrange components and tools to integrate with widget controllers, Distributed Immutable Ledger Database servers, or trusted platform servers.

The operation of certain aspects of the present disclosure have been described with respect to flowchart illustrations. In at least one of various embodiments, processes described in conjunction with FIGS. 1 to 9B, can be implemented by and/or executed on a single network computer. In other embodiments, these processes or portions of these processes can be implemented by and/or executed on a plurality of network computers. Likewise, in at least one of the various embodiments, processes or portions thereof, can operate on one or more client computers, such as client computer. However, embodiments are not so limited, and various combinations of network computers, client computers, virtual machines, or the like can be used. Further, in at least one of the various embodiments, the processes described in conjunction with the flowchart illustrations can be operative in system with logical architectures, such as those described in herein.

It will be understood that each block of the flowchart illustrations described herein, and combinations of blocks in the flowchart illustrations, can be implemented by computer program instructions. These program instructions can be provided to a processor to produce a machine, such that the instructions, which execute on the processor, create means for implementing the actions specified in the flowchart block or blocks. The computer program instructions can be executed by a processor to cause a series of operational steps to be performed by the processor to produce a computer-implemented process such that the instructions, which execute on the processor to provide steps for implementing the actions specified in the flowchart block or blocks. The computer program instructions can also cause at least some of the operational steps shown in the blocks of the flowchart to be performed in parallel. Moreover, some of the steps can also be performed across more than one processor, such as might arise in a multi-processor computer system or even a group of multiple computer systems. In addition, one or more blocks or combinations of blocks in the flowchart illustration can also be performed concurrently with other blocks or combinations of blocks, or even in a different sequence than illustrated without departing from the scope or spirit of the present disclosure.

Accordingly, blocks of the flowchart illustrations support combinations for performing the specified actions, combinations of steps for performing the specified actions and program instructions for performing the specified actions. It will also be understood that each block of the flowchart illustrations, and combinations of blocks in the flowchart illustrations, can be implemented by special purpose hardware-based systems, which perform the specified actions or steps, or combinations of special purpose hardware and computer instructions. The foregoing examples should not be construed as limiting and/or exhaustive, but rather, as illustrative use cases to show an implementation of at least one of the various embodiments of the present disclosure.

What is claimed is:

1. A system comprising:
   a platform comprising a mediator site and a manifest database, wherein the manifest database comprises manifest files for each a plurality of payment entities mapped to a plurality of unique identifiers for the plurality of payment entities;
   wherein the platform is configured to interface with a client device application that is configured to:
   navigate to an enrollment page to enroll one of the plurality of payment entities mapped to the unique identifier;
   obtain the unique identifier from the payment entity;
   open a web browser interface to the mediator site;
   send the unique identifier to the mediator site; and
   accept a cookie including tracking information and payment entity information from the manifest file, the cookie including the unique identifier and at least one tracking field about the payment entity mapped to the unique identifier from the mediator site; and
   provide the payment entity information on the cookie to a merchant website when a client user engages in a transaction on the merchant website.

2. The system of claim 1, wherein the interface comprises a payment entity application program interface configured to communicate with the application on the client device.

3. The system of claim 1, wherein the client device application for the interface is a web browser on the client device, and when the web browser opens a website for one of the payment entities on the manifest, the web browser is configured to:
   automatically navigate to the enrollment page with a link to enroll the client device with the mediator site;
   accept the cookie from the mediator site; and
   present a dynamic interface object when the client user engages in the transaction on a merchant website.

4. The system of claim 3, wherein the dynamic interface object is configured to automatically navigate the user to the payment entity website and provide payment data for the merchant site.

5. The system of claim 1, wherein the platform is configured to perform the method comprising:
   obtaining payor information about the payment entity;
   generating the manifest file including the payment entity information, wherein the manifest file includes the payor information for one or more of the payment entities;
   generating the unique identifier for the payment entity; and
   store the unique identifier on the manifest at the mediator site.

6. The system of claim 1, wherein the payor information comprises a Name, a Custom URL, a Logo, an Internet/URL String.

7. The system of claim 1, wherein the cookie comprises, for each payor identity:
   a Wallet ID field configured to uniquely identify the payment entity with the unique identifier;
   a Sequence field tracking field configured to identify priority of the payment entity; and
   a Last Updated tracking field configured to update the last time the payment entity was used for a transaction operation.

8. A dynamic interface object for an application or web browser comprising:
   code for displaying payor information about a payment entity from a cookie placed in a user device by a mediator website;
   wherein the dynamic interface object is configured to display the payor information for one of a plurality of payment entities; and
   wherein the dynamic interface object is configured to default to display the payor entity information that was last used for a transaction operation, navigate a client device to a payment entity website, and provide payment data for transacting with a merchant site.

9. The dynamic interface object of claim 8, wherein the dynamic interface object is configured to access the cookie data including a unique identifier identifying the payment entity, wherein the unique identifier is generated by a platform for the mediator site and mapped to the payment entity, and wherein the mapped data is stored on a manifest file hosted at the platform.

10. The dynamic interface object of claim 9, wherein the cookie data further includes a tracking field configured to identify the sequence of the payment entity, a Last Updated tracking field configured to update the time the payment entity was used for a transaction operation, and the tracking field data is used to determine, from the plurality of payment entities, which payment entity payor information to display.

11. A method comprising:
   generating a manifest file for a payment entity comprising a unique identification for the payment entity and payment entity information;

storing the manifest file in a manifest database comprising a plurality of the manifest files, the manifest database comprising a plurality of payment entities mapped to a plurality of unique identifications;

transmitting the unique identification to the payment entity;

receiving, at a mediator website, one or more of the unique identifications for one or more of the payment entities from a client device; and generating and transmitting a cookie from the mediator website to the client device, wherein the cookie is configured to track the one or more of the payment entities stored in the manifest database that are registered to the client device, wherein the cookie is configured to allow an application interface to present a dynamic interface object on the client device when the client device engages in a transaction on a merchant website and provide payment data for the merchant website.

12. The method of claim 11, wherein the dynamic interface object is configured to navigate the user to the payment entity website and provide payment data for the merchant site.

13. The method of claim 11, further comprising:
obtaining payor information about the payment entity; and
generating the manifest file including the payor information about payment entity.

14. The method of claim 13, wherein the payor information comprises a Name, a Custom URL, a Logo, and an Internet/URL String.

15. The method of claim 11, wherein the cookie comprises, for each payment entity:
a Wallet ID field configured to uniquely identify the payor entity;
a Sequence tracking field configured to identify the sequence of the dynamic button; and
a Last Updated tracking field configured to update the time the payor entity entry was used for a transaction operation.

16. The method of claim 11, wherein the dynamic interface object is configured to:
display payor information from the cookie placed in the client device for one of a plurality of the payment entities, wherein the dynamic interface object is configured to default to display the payor entity information that was last used for a transaction operation.

\* \* \* \* \*